April 16, 1963 J. LEWINSKI ETAL 3,085,330
CUTTING DEVICE
Filed Aug. 18, 1961
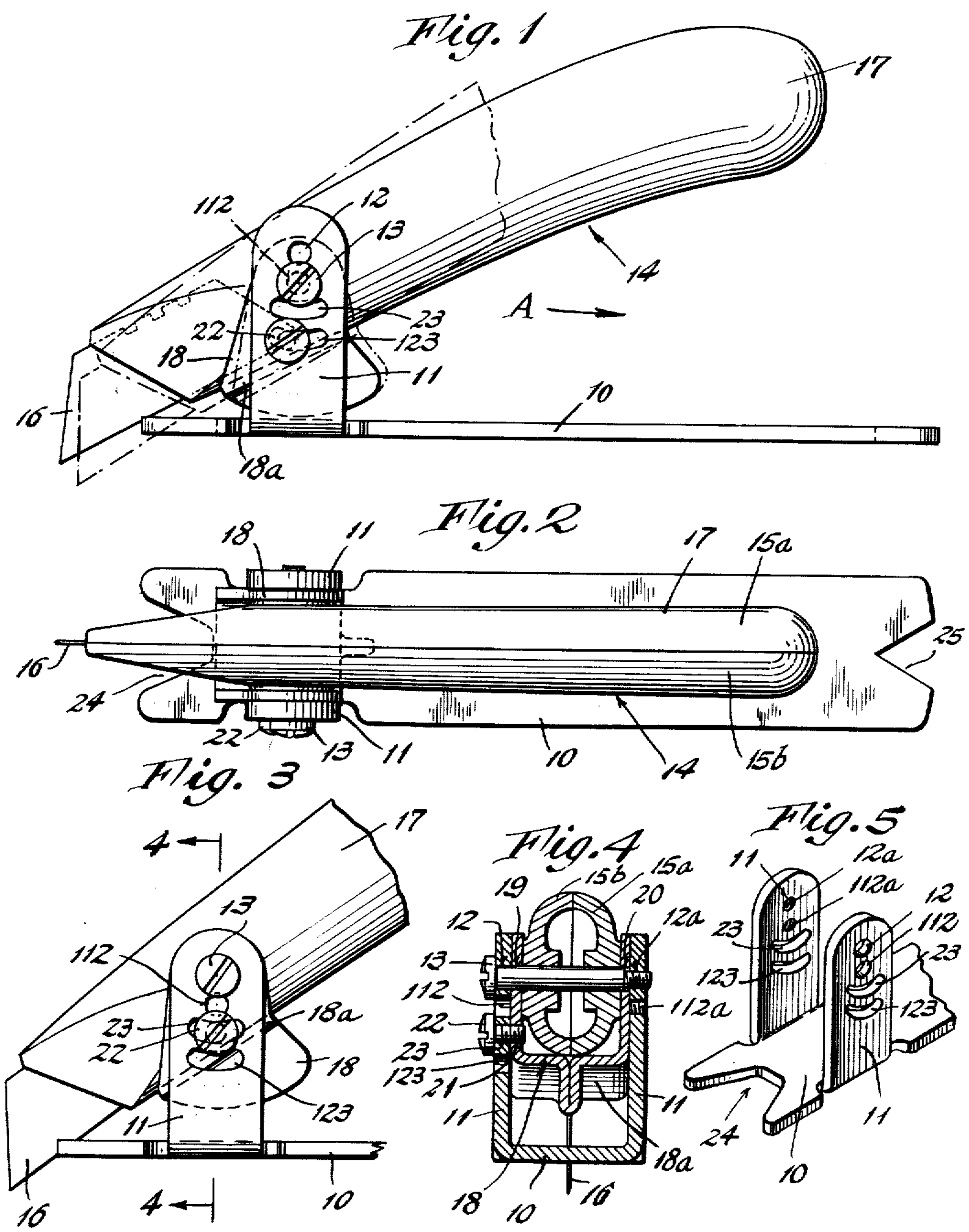
INVENTORS
Julius Lewinski
Abraham Rashbaum
BY
Johnson and Kline
ATTORNEYS United States Patent Office 3,085,330

Patented Apr. 16, 1963

3,085,330

CUTTING DEVICE

Julius Lewinski, New York, and Abraham Rashbaum, Whitestone, N.Y., assignors to Willcox & Gibbs Sewing Machine Company, New York, N.Y., a corporation of New York Filed Aug. 18, 1961, Ser. No. 132,465
3 Claims. (Cl. 30—293)

The present invention relates to a cutting device and more particularly to a cutting device for simultaneously cutting a plurality of superposed pattern sheets in a pattern grading operation.

In grading patterns heretofore, the patterns have been individually cut by means of shears or a knife being drawn thereover along predetermined lines formed from a master pattern.

The present invention provides a cutting device which greatly simplifies this operation, particularly one which is capable of readily cutting through a plurality of superposed sheets for simultaneously cutting a plurality of patterns.

In carrying out the invention a base is provided on which is mounted a cutting tool having a cutting edge and a handle whereby the cutting edge is drawn through the superposed sheets of pattern paper to cut the same. The base is adapted to be supported on the top sheet of paper and stabilize the device during the cutting operation and is provided with means to facilitate the guiding of the cutting tool during said cutting operation.

A feature of the invention resides in the means for adjustably mounting and locking the cutting tool in adjusted position to permit it to be properly positioned for cutting various number of sheets, which means is easy to operate and which will accurately hold the knife in position during the cutting operation.

Other features and advantages of the invention will be apparent from the specification and claims when considered in connection with the accompanying drawings in which:

FIGURE 1 is a side view of the device of the present invention with the cutting tool shown in a second adjusted position in dot and dash outline.

FIG. 2 is a top view of the device.

FIG. 3 is an enlarged detail of the mounting of the cutting tool.

FIG. 4 is a sectional view taken along line 4—4 of FIG. 3.

FIG. 5 is a fragmentary view of the base and mounting brackets with the tool removed.

As shown in the drawings the cutting device of the present invention comprises a base 10 having upstanding brackets 11 at each side provided with aligned holes 12, 12*a*, one of which is threaded, and into which a bolt 13 extends for mounting a cutting tool 14 in a desired adjustable position on the base to be shown through the material (not shown) to be cut when the device is moved in the direction of the arrow A in FIG. 1 with the base providing a steady rest for the cutting tool and holding the material against shifting at the time of the cutting thereof by the tool. The cutting tool comprises a body bisected to form a pair of longitudinal sections 15*a*, 15*b* which clamp a cutting blade or knife 16 between them at their lower ends and form a gripping handle 17 at the upper ends. The two sections of the body are clamped together and into gripping relation with the blade by the mounting bolt 13 being threaded into the hole 12*a*.

As shown in the drawings, the bracket portions are provided with additional aligned holes 112, 112*a* for the purpose of adjusting the height of the cutting knife with respect to the base. This bolt also locks the cutting tool in adjusted angular position. Preferably, additional means are provided for holding the cutting knife in adjusted position about the pivot. While this may take various forms, in the herein illustrated form of the invention it comprises a saddle 18 which extends around the body of the cutting tool and is disposed between the body and the brackets. The saddle has aligned apertures 19, 20 through which the bolt 13 passes to lock the saddle to the body with the flat bottom 18*a* engaging the bottom of the body to connect the two for movement therewith. In order to hold the saddle and its connected body in various adjusted positions around the pivot formed by the bolt 13, for example as shown by the dot and dash position of FIG. 1, the saddle is provided with a threaded aperture 21 to receive a locking bolt 22 disposed in the appropriate arcuate slots 23, 123 concentric with the holes 12 and 112 in the bracket for locking the saddle to the bracket and against movement about the pivot when pressure is applied to the knife to draw the knife through the material being cut.

A feature of the invention includes the provision of aligned sight openings 24, 25 adjacent each end of the base. The sight opening 24 at the rear of the base is in the form of a U-shape notch and receives the cutting blade as it pivots to various positions, as shown in FIG. 1. At the same time the notch provides a sighting means, as shown in FIG. 2, whereby the movement of the cutting edge over the line of the pattern can be watched at the point of cutting and accurately controlled during the cutting operation.

To further assist in guiding the device, the forward sight opening 25 at the end of the base is formed as a V notch with the apex aiding in aligning the cutting device with the lines on the pattern when long cuts are being made.

It will be seen that the cutter of the present invention, therefore, is of simple construction, is easy to manufacture from sheet metal or plastic, can be readily adusted to various positions to control the depth of cut of the cutting edge and securely locks the cutting tool in adjusted position and is provided with a stabilizing base having novel sight means whereby the tool can be readily moved and guided during the cutting operation.

Variations and modifications may be made within the scope of the claims and portions of the improvements may be used without others.

We claim:

1. A device for cutting a plurality of superposed pattern sheets comprising an elongate, flat supporting base having forward and rear aligned sighting notches at each end, and brackets projecting upwardly from each side of the flat base and having a plurality of vertically disposed aligned openings for receiving a bolt passing through an elongate cutting tool having a cutting edge for pivotally mounting said tool at various heights with the cutting edge disposed in the rear sighting notch, thereby permitting a view of the cutting operation, the forward sighting notch providing sighting means for guiding the cutting tool, said tool having means cooperating with arcuate slots in said brackets concentric with said aligned openings for holding the tool against pivoting under cutting pressure applied to the tool.

2. A device for cutting a plurality of superposed pattern sheets comprising an elongate, flat supporting base having forward and rear aligned sighting notches at each end, brackets projecting upwardly from each side of the base and having aligned openings for receiving a bolt passing through an elongate cutting tool having a longitudinally bisected body provided with a blade having a cutting edge for causing the body to grip the blade and for pivotally mounting said tool with the cutting edge disposed in the rear sighting notch, thereby permitting a view of the cutting operation, the forward sighting notch providing sighting means for guiding the cutting tool, and means on said tool cooperating with the base for holding the tool against pivoting about the mounting bolt under cutting pressure applied to the tool.

3. The invention as defined in claim 2 wherein the brackets have apertures therein and the last-named means includes a saddle carried by the tool and disposed between said brackets, said saddle having apertures aligned with the apertures in the bracket, and means disposed in said aligned apertures for locking the saddle in position between the brackets against undesired pivoting during cutting.

References Cited in the file of this patent

UNITED STATES PATENTS

| | | |
|---|---|---|
| 502,008 | McMenamin | July 25, 1893 |
| 1,031,509 | Aylor | July 2, 1912 |
| 1,255,860 | Courter | Feb. 12, 1918 |
| 2,007,395 | Howard | July 9, 1935 |
| 2,018,149 | Randle et al. | Oct. 22, 1935 |
| 2,164,050 | Brown | June 27, 1939 |
| 2,776,480 | Abel | Jan. 8, 1957 |
| 2,908,072 | Nitenson | Oct. 20, 1959 |

FOREIGN PATENTS

| | | |
|---|---|---|
| 4,233 | Great Britain | 1893 |

UNITED STATES PATENT OFFICE

CERTIFICATE OF CORRECTION

Patent No. 3,085,330 April 16, 1963

Julius Lewinski et al.

It is hereby certified that error appears in the above numbered patent requiring correction and that the said Letters Patent should read as corrected below.

Column 1, line 57, for "shown" read -- drawn --.

Signed and sealed this 5th day of November 1963.

(SEAL)
Attest:

ERNEST W. SWIDER
Attesting Officer

EDWIN L. REYNOLDS
Acting Commissioner of Patents